(12) United States Patent
Fitz et al.

(10) Patent No.: US 6,370,303 B1
(45) Date of Patent: Apr. 9, 2002

(54) OPTICAL FIBER CABLE WITH SUPPORT MEMBER FOR INDOOR AND OUTDOOR USE

(75) Inventors: Jon Fitz, West Columbia; Roger Vaughn, Columbia, both of SC (US)

(73) Assignee: Pirelli Cables and Systems LLC, Columbia, SC (US)

( * ) Notice: Subject to any disclaimer, the term of this patent is extended or adjusted under 35 U.S.C. 154(b) by 0 days.

(21) Appl. No.: 09/693,602

(22) Filed: Oct. 20, 2000

(51) Int. Cl.$^7$ ................................................. G02B 6/44
(52) U.S. Cl. ....................................................... 385/113
(58) Field of Search ........................... 385/110–114, 147

(56) References Cited

U.S. PATENT DOCUMENTS

| | | |
|---|---|---|
| 4,097,119 A | 6/1978 | Kumamaru et al. |
| 4,188,088 A | 2/1980 | Anderson et al. |
| 4,467,138 A | 8/1984 | Brorein |
| 4,761,053 A | 8/1988 | Cogelia et al. |
| 4,763,983 A | 8/1988 | Keith |
| 4,852,965 A | 8/1989 | Mullin et al. |
| 4,856,867 A | 8/1989 | Gaylin |
| 5,095,176 A | 3/1992 | Harbrecht et al. |
| 5,136,683 A | 8/1992 | Aoki et al. |
| 5,173,960 A | 12/1992 | Dickinson |
| 5,180,890 A | 1/1993 | Pendergrass et al. |
| 5,189,718 A | 2/1993 | Barrett et al. |
| 5,371,823 A | 12/1994 | Barrett et al. |
| 5,557,698 A * | 9/1996 | Galen et al. ................ 385/103 |
| 5,602,953 A | 2/1997 | Delage et al. |
| 5,636,305 A | 6/1997 | Warner et al. |
| 5,636,308 A | 6/1997 | Personne et al. |
| 5,651,081 A | 7/1997 | Blew et al. |

FOREIGN PATENT DOCUMENTS

| | | | |
|---|---|---|---|
| EP | 0380872 | 12/1989 | ............ H02G/7/00 |
| EP | 0461794 | 6/1991 | ............ H01B/7/18 |
| EP | 1041421 | 3/2000 | ............ G02B/6/44 |
| EP | 1059548 | 6/2000 | ............ G02B/6/44 |

* cited by examiner

Primary Examiner—Akm E. Ullah
(74) Attorney, Agent, or Firm—L. P. Brooks; Norris, Mc Laughlin & Marcus (57) ABSTRACT

An optical fiber cable has a jacket of flame retardant and ultraviolet stabilized plastic and meets the requirements for both outdoor and indoor use. The jacket has two longitudinal portions interconnected by an intermediate longitudinal portion of a thickness less than the thickness of the two portions. One of the two portions contains a longitudinally extending strength member of sufficient tensile strength to support the cable when the cable is suspended outdoors between relatively widely spaced supports. The other of the two portions has a longitudinally extending bore which contains at least one tightly buffered, longitudinally extending optical fiber and can also contain a flexible, longitudinally extending strength member. When the cable is suspended outdoors between support, the intermediate jacket portion has sufficient strength to prevent separation of the strength member portion from the optical fiber portion. The strength member portion, when desired, can be separated from the optical fiber portion to form an optical fiber subunit, which is flexible and meets indoor riser requirements, and a strength member subunit.

15 Claims, 3 Drawing Sheets

OPTICAL FIBER CABLE WITH SUPPORT MEMBER FOR INDOOR AND OUTDOOR USE

FIELD OF THE INVENTION

The present invention relates to an optical fiber cable for indoor and outdoor applications, and more particularly, an optical fiber cable having an optical fiber subunit for independent use indoors or within small splice enclosures and a support subunit which makes the cable suitable for outdoor use and is easily separable from the optical fiber subunit.

BACKGROUND OF THE INVENTION

Optical fiber is now used in a variety of telecommunications applications because of its small physical size and high bandwidth capacity.

The use of optical fibers in telecommunications applications initially involved the application of optical fiber cables, which were constructed with a large number of optical fibers, as long distance telecommunication data links between a central office and a switching office and between different switching offices of telecommunications data service providers, e.g., a telephone company. Data transmission links installed outdoors and extending to the premises of a customer of a telecommunications data service provider from, for example, a switching office or an office in a local distribution network, which are known as drop cables and primarily constituted copper cables, however, usually were not replaced by optical fiber links.

Telecommunications customers have begun to demand increased bandwidth for their offices or homes. Consequently, optical fiber links have begun to be deployed further into the telecommunications infrastructure to satisfy such demand. For example, optical fiber links have become commonplace in city or metropolitan area optical fiber ring networks and also in the main data distribution lines between a switching office and a customer's home or office.

It is further envisioned that some telecommunications networks will be constructed to include optical fiber links which extend to within the customer's premises from, for example, an optical ring switching office. Such networks often are referred to as "Fiber To The Home" or FTTH networks. Therefore, in a FTTH network, even the drop cables would constitute optical fiber links.

A drop cable frequently extends from a pole to the customer's premises. The cable may also extend to such pole from a terminal or connection box located hundreds of feet from the pole, and the cable may be suspended between poles hundreds of feet apart. Thus, a satisfactory drop cable must withstand outdoor weather conditions and be relatively robust for such use. In addition, the cable must have a relatively long life when exposed to sunlight, particularly, ultra-violet light.

The optical fiber of the drop cable may or may not extend into the customer's premises. The drop cable can terminate at, or close to, the entrance to the customer's premises, but in such case, and if the optical fiber is to extend into the customer's premises, it is then necessary to splice another optical fiber cable to the drop cable, usually at a connection box. Preferably, the jacket of the drop cable is flame retardant even when it is outdoors to prevent the spread of fire by way of the drop cable. The other cable which extends from the drop cable to the customer's equipment is indoors and must meet some requirements different from the outdoor drop cable. For example, like the drop cable, the indoor cable should have a flame retardant jacket, and in addition, should be suitable for feeding through relatively small ducts, be flexible and lightweight and be capable of being bent to a relatively small radius.

A drop cable which can be used both outdoors and indoors is desirable not only because of the types of cables needed can be reduced, but also because a cable splice at or near the entrance to the customer's premises can be eliminated. Ideally, a drop cable should be lightweight, inexpensive, flexible and self-supporting. It should not require any new hardware for installation, and should not require any new or special tools in order for the craft-person to install it. It should be designed so that fiber optical connectors can easily be installed on it, either in the field, or in a manufacturing setting. It should also be designed so that it can be routed within small termination enclosures so that the length of exposed fiber is minimized.

Cables with optical fibers and strength members which can be used as aerial cables are known in the art. See, for example, U.S. Pat. Nos. 4,763,983; 4,852,965 and 5,095,176. However, such cables are not suitable for both outdoor and indoor use.

Telecommunications data service provider customers expect continuous, uninterrupted, high quality data transmission service. An optical fiber, however, is a mechanically fragile structure whose optical signal transmission characteristics can degrade substantially if the fiber is mechanically stressed. Hence, an optical fiber drop cable can become non-functional, i.e., have too much optical signal attenuation for purposes of satisfactory optical signal transmission in a telecommunications application, if the cable design does not sufficiently limit or avoid severe mechanical stress on the fiber contained in the cable for the planned applications.

The planned application of an optical fiber drop cable outdoors, and in particular in a geographical region experiencing winter weather conditions, is likely to subject the fiber contained within the cable to additional loading. For example, an optical fiber contained in an optical fiber drop cable which is suspended in air from vertical supports is likely to experience additional stress and strain upon accumulation of a layer of ice on external surfaces of the cable. The resultant increase in the total weight or load on the cable caused by the ice layer would be a function of the radial thickness of the layer of ice and the outer diameter of the external surface of the cable. If the cable does not include sufficient load absorbing or distributing means, such as strength members, too much stress and strain likely would be placed on the fiber, thereby causing significant and unacceptable optical signal transmission attenuation.

There is a need for an optical fiber cable design available which can adequately satisfy customer and industry needs and demands for an optical fiber drop cable which provides reliable and high quality data transmission service in an aerial application in an outdoor environment and, simultaneously, provides ease of application in an indoor environment using standard hardware and equipment and satisfies indoor cable requirements.

Some prior art optical fiber cables include at least one strength member or layer of strength members to control the behavior of the drop cable when it is subjected to bending and, thus, protect the optical fibers within the cable from experiencing too much stress or strain. The inclusion of too large or multiple strength members within a cable, however, is disadvantageous in a FTTH application for several reasons. First, the inclusion of a plurality of strength members in the cable jacket is likely to make the cable extremely stiff.

An overly stiff cable makes handling and maneuverability of the cable difficult because substantial energy would be required to bend the cable, which may be required during application of the cable indoors. Also, the inclusion of multiple strength members in the jacket, for example, disposed symmetrically about the optical fiber transmission media, greatly increases the outer diameter of the cable. As explained above, smaller cable outer diameter is desirable to decrease the potential loading that a layer of ice formed on an optical fiber drop cable which has been installed suspended from vertical poles can cause. Finally, it is more difficult to secure aerial hardware to multiple strength members than to a single strength member in an aerial application of a cable.

Indoor optical fiber cables, which are often referred to as premises cables, are available in a variety of forms which provide for flexibility, ease of maneuverability and ease of connectorization to standard hardware using standard tools. For example, so-called Simplex cables include only one fiber and are standardized to specific dimensions for which a wide variety of hardware is readily available. Another cable design, called a "zipcord", includes two Simplex cables of standard dimensions, which have been joined by a web and are easily separable for termination. Both cable designs tend to be very flexible and provide for ease of access to the fiber(s) contained within the cable. Current designs of optical fiber drop cables which include at least one support means having very high tensile strength in anticipation of planned outdoor aerial application, however, do not have the flexibility to provide for relative ease of application of the optical fiber components in an indoor environment or within small splice enclosures.

Therefore, there exists a need for an optical fiber drop cable which is inexpensive to manufacture, which is self-supporting and easily installed in an outdoor environment and which is sufficiently lightweight, compact and flexible and does not require any new hardware or new or special tools for application of the optical fiber transmission media contained within the cable in an indoor environment or within small splice enclosures.

SUMMARY OF THE INVENTION

The optical fiber cable of the invention has a jacket of flame retardant and ultra violet stabilized plastic and meets the requirements for both outdoor and indoor use. The jacket has two longitudinal portions interconnected by an intermediate longitudinal portion of a thickness less than the thickness of the two portions. One of the two portions contains a longitudinally extending strength member of sufficient tensile strength to support the cable when the cable is suspended outdoors between relatively widely spaced supports. The other of the two portions has a longitudinally extending bore which contains at least one tightly buffered, longitudinally extending optical fiber and can also contain a flexible, longitudinally extending strength member.

When the cable is suspended outdoors between supports, the intermediate jacket portion has sufficient strength to prevent separation of the strength member portion from the optical fiber portion, but when desired, the strength member portion can be separated from the optical fiber portion by severing the intermediate portion longitudinally to thereby form a strength member subunit and an optical fiber subunit. The optical fiber subunit is flexible and meets indoor riser requirements and can be fed through ducts, etc., without the strength member subunit, to the customer's equipment. Since the optical fiber is tightly buffered, the fiber is protected when the optical fiber subunit is used alone, and the fiber can be additionally protected by one or more flexible strength members in the bore of the optical fiber subunit.

The strength member subunit normally will terminate near the entrance to the customer's premises and unused strength member submit can be discarded. However, outdoors the strength member itself preferably is used to suspend the cable from supports. For this purpose, the jacket can be cut open at the strength member to permit separation of a length of the strength member from the jacket. Also, to facilitate such separation, the strength member is not bonded to the jacket.

In a preferred embodiment, the intermediate portion of the jacket is a web which extends along the longitudinal length of the cable and between the subunits and, at least in part, couples the fiber subunit to the strength member subunit.

In a preferred embodiment, each of the subunits is in the form of a cylindrical element which is circular in cross-section and which extends longitudinally along an axis which is parallel to the axis of the other subunit, and when the subunits are coupled to each other, the cable configuration has, in cross-section, the shape of the FIG. 8.

In a preferred embodiment, the fiber subunit has a longitudinal bore larger than the diameter of the tightly buffered fiber which is received therein, so that the fiber can move freely within the fiber subunit.

In a further preferred embodiment, the longitudinal bore of the fiber subunit includes at least one longitudinally extending strength member, such as a flexible aramid yarn, disposed about the fiber, without enclosing the fiber, to provide tensile strength to the fiber subunit and cushioning the fiber, especially when the fiber subunit is separated from the strength member subunit.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

Figure 1:
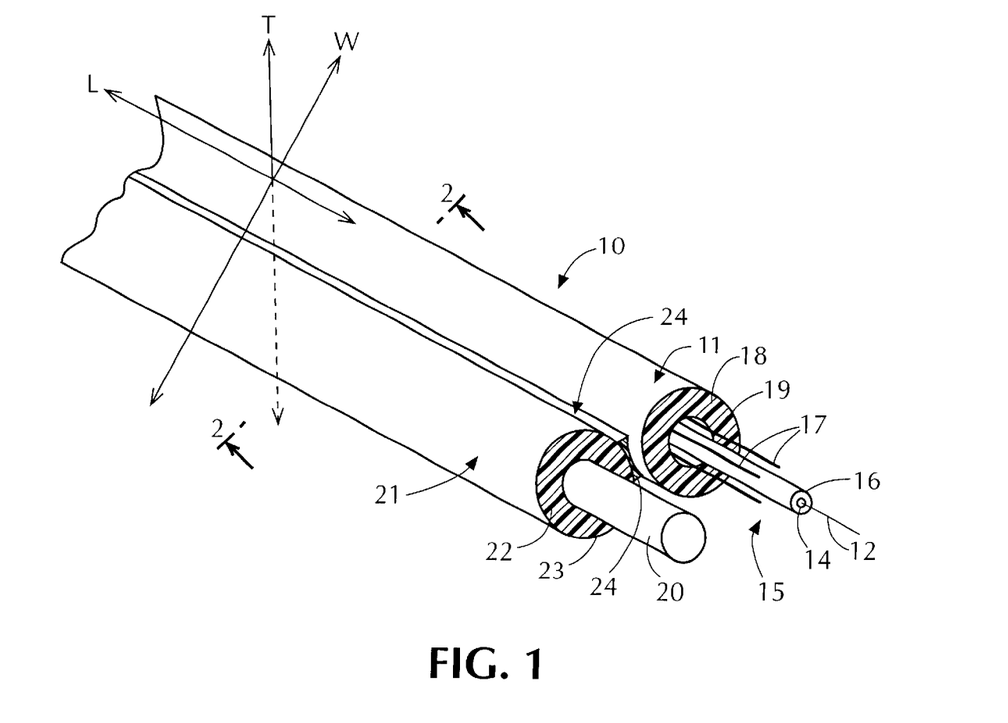
FIG. 1 is a cut-back perspective view of an optical fiber drop cable in accordance with the present invention.
Figure 2:
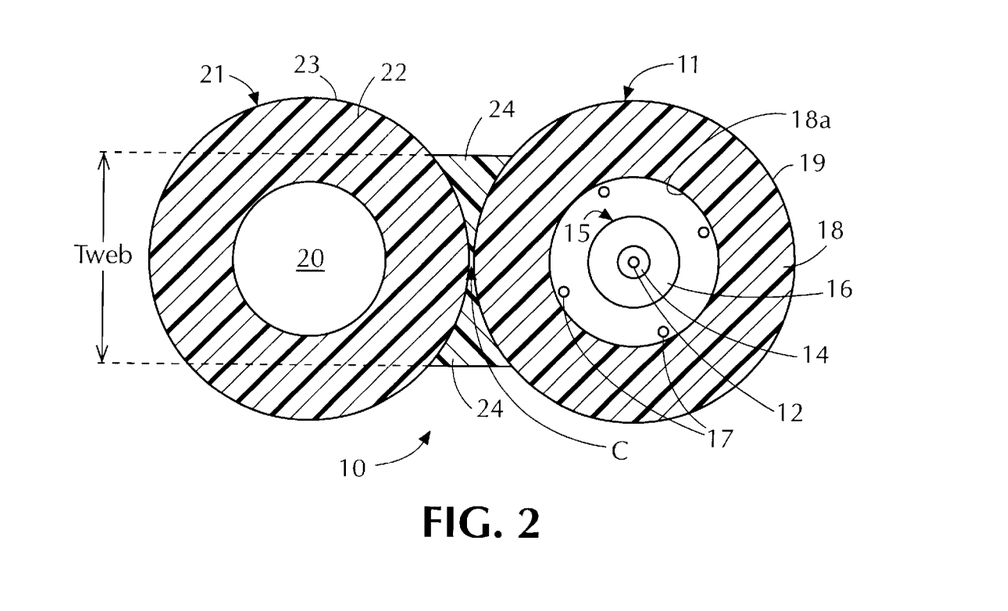
FIG. 2 is a cross-sectional view of the cable of FIG. 1 taken along the line 2—2.

FIGS. 1–2 illustrate a preferred embodiment of an optical fiber drop cable 10 for indoor and outdoor use in accordance with the present invention. Referring to FIGS. 1–2, the cable 10 includes a plastic jacket comprising a longitudinally extending portion 18, a longitudinally extending portion 22 spaced from the portion 18 in the width direction of the jacket and an intermediate portion in the form of a web 24 which extends between the subunits 11 and 21. The portion 22 encircles a strength member 20 and the portion 18 loosely receives in a bore 18a at least one tight buffered optical fiber 15. When the web 24 is cut longitudinally, the portions 18 and 22 form two sub-units, an optical fiber subunit 11 and a strength member or support subunit 21. To facilitate the separation of the subunits 11 and 21, the web 24 has a thickness less than the diameters of the portions 18 and 22.

The subunit 11 comprises a tight buffered optical waveguide fiber 15 of the kind well known to those skilled in the art. For example, the fiber 15 can comprise a core 12, a cladding 14 of lower index of refraction than the core 12, optionally, at least one protective, ultraviolet (UV) light curable coating (not shown) which is disposed on the cladding 14 and which is typically supplied by the optical fiber manufacturer, and an additional tight buffering layer 16. The core 12 can be, for example, a single mode core or a multimode core having an outside diameter of, for example, about 10 microns or about 50–62.5 microns. Although not shown in the drawings, the fiber 15 can include a layer of soft, UV light cured acrylate surrounding the cladding 14 and a secondary layer of harder, UV light cured acrylate covering the soft layer.

The buffering layer 16 preferably has an outside diameter of about 600 or 900 microns and can be formed from polyvinylchloride (PVC) or a like material, such as, for example, compound No. 16901 manufactured by North American Plastics, P.O. Box 845, Aberdeen Mich. 39370. The buffering layer 16 is a protective layer and eases handling, organization and connectorization of the fiber 15 in connection with other optical fibers or optical fiber connectors or terminations as may be generally required in indoor applications of the cable 10 when the subunit 11 is separated from the subunit 21.

Preferably, a layer of longitudinally extending, strength member 17, such as flexible reinforced aramid yarns, can be disposed around the fiber 15. The strength members 17 provide the subunit 11 with tensile strength while maintaining substantial flexibility in the subunit 11, which is especially advantageous when the subunit 11 is separated from the subunit 21. Further, the strength members 17 provide cushioning to the fiber 15 within the subunit 11.

In a preferred embodiment, the strength members 17, which most preferably are flexible, non-impregnated fibrous members, do not completely surround the fiber 15 to provide that (i) the fiber subunit 11 is flexible and easily bent, and (ii) the strength members 17 do not provide significant resistance to compression forces applied axially or longitudinally to the subunit 11.

Although the rectilinear axial length of the fiber 15 can be less than the rectilinear length of each of the strength members 17, preferably, as is customary in the art, the rectilinear length of the fiber 15 is greater by a small amount, than the rectilinear lengths of the strength members 17.

In a preferred embodiment, the strength members 17 constitute four or six, longitudinally extending flexible aramid yarns, each about 1420 deniers, which are disposed around the outer surface of the fiber 15. Preferably, the strength members 17 are evenly distributed about the fiber 15. In the preferred embodiment, the strength members 17 do not constitute, and the subunit unit 11 does not contain, an element which can support the entire load of the cable 10 in an aerial application in which such element would be used to suspend the cable 10 between spaced supports. Preferably, it is only the subunit 21 which contains a strength member that can support at least the entire load of the cable 10 in an aerial application.

The portion 18 of the outerjacket encircles the layer of strength members 17 to form the composite structure of the subunit 11 in which the fiber 15 and the strength members 17 are loosely received within the sheath 18. The jacket portion 18 protects the fiber 15 from severe environmental conditions and the adverse affects of abrasion which may occur in an installation of the entire cable 10, or just the subunit 11. The jacket portion 18 has a peripheral outer surface 19 which conforms substantially to the surface of a cylinder. In a preferred embodiment, the portion 18 has an inside or bore 18a diameter of about 1.9 mm and an outside diameter which is the same as that of a standard indoor premises or Simplex cable, for example, about 2.7–3.1 mm and, most preferably, about 2.9 mm.

In a preferred embodiment, the bore diameter of the portion 18 is sufficiently large to provide that the at least one tight buffered fiber 15 in the fiber subunit 11 is loosely contained within the fiber subunit 11. In a further preferred embodiment, the region in the subunit 11 enclosed within the portion 18 includes the fiber 15 and the strength members 17 and, most preferably, all empty spaces within the region not containing the fiber 15 are not filled completely with strength members 17. The strength members 17, in addition to providing strength to the subunit 11 and cushioning to the fiber 15, prevent the wall of the bore 18a from sticking to the buffering layer 16 of the fiber 15.

The jacket portion 18 preferably is made of PVC or like material or the same material from which the buffering layer 16 is formed. In a preferred embodiment, the portion 18 is made from an engineering thermoplastic having excellent crush resistance, tensile strength, flexibility and chemical resistance, as is known in the art. In a preferred embodiment, the jacket portion 18 has a Young's modulus of about 10–400 Mpa, and most preferably, about 13 Mpa.

In a further embodiment, the jacket portion 18 is made of a UV light and sunlight stabilized, flame-retardant polymer or PVC material. As the jacketing material of the subunit 11 is flame retardant, the subunit 11 alone can be used for UL riser applications. Also, UV light and sunlight exposure protection features of the jacketing material of the subunit 11 permits outdoor use of the subunit 11.

Advantageously, the fiber subunit 11 would be of the same materials and dimensions as a standard indoor optical fiber cable, such as a UL optical fiber, riser-rated Simplex cable, and preferably constitute a complete premises cable, to provide that the subunit 11 itself can be easily routed in an indoor application and connectorized where necessary.

In another embodiment, the fiber subunit 11 may include two or more tight buffered optical waveguide fibers 15 loosely received within the jacket portion 18 as illustrated in another embodiment of the inventive optical fiber drop cable shown in FIG. 4 and discussed in detail below. In a preferred embodiment with the two tight buffered fibers 15, each of the tight buffered fibers 15 would have a diameter of about 600 microns and the tight buffered fibers 15 would be loosely disposed within the region defined within the inner diameter or bore 18a of the jacket portion 18, which is preferably about 1.9 mm.

Referring again to FIGS. 1–2, the support or strength member subunit 21 of the cable 10 comprises a single longitudinally extending strength member 20 enclosed by the jacket portion 22. As explained in detail below in connection with the text accompanying the description of FIGS. 2–4, the subunit 21 preferably is coupled to the subunit 11 in a substantially FIG. 8 configuration. The strength member 20 contained within the subunit 21 can support the entire weight of the cable and any additional loading on the cable when the cable 10 is installed in an aerial application suspended between spaced supports by such element and prevent optical signal attenuation in the fiber 15 above a predetermined maximum. No other elements, including other strength members in the cable 10, alone or in combination, are necessary to support such a loading in such an aerial application of the cable and to maintain optical signal attenuation in the fiber 15 below the predetermined maximum.

The jacket portion 22 preferably is made of the same plastic material as the jacket portion 18, i.e., it is UV stabilized and flame-retardant even though it need not be flame retardant because the subunit 21 is not necessarily required to meet indoor specifications.

Similarly, the web 24 preferably is made of the same plastic material as the jacket portions 18 and 22. In the event that the portions 18 and 22 and the web 24 are made of the same material, the cable 10 can be extruded as one piece while inserting the optical fiber or fibers and the strength member or members. However, if desired, the web 24 can be made of a different material than the portions 18 and 22 as long as it meets the outdoor use requirements and the web 24 can be separately made and bonded to the jacket portions 18 and 22.

As described hereinafter, the cable 10 may be suspended by the strength member 20. In such event, the dimensions and materials of the web 24 must be selected so that the subunits 11 and 21 cannot be separated by the expected loading on the cable 10 when the distance between supports is significant, e.g., 100 feet or more.

Figure 5:
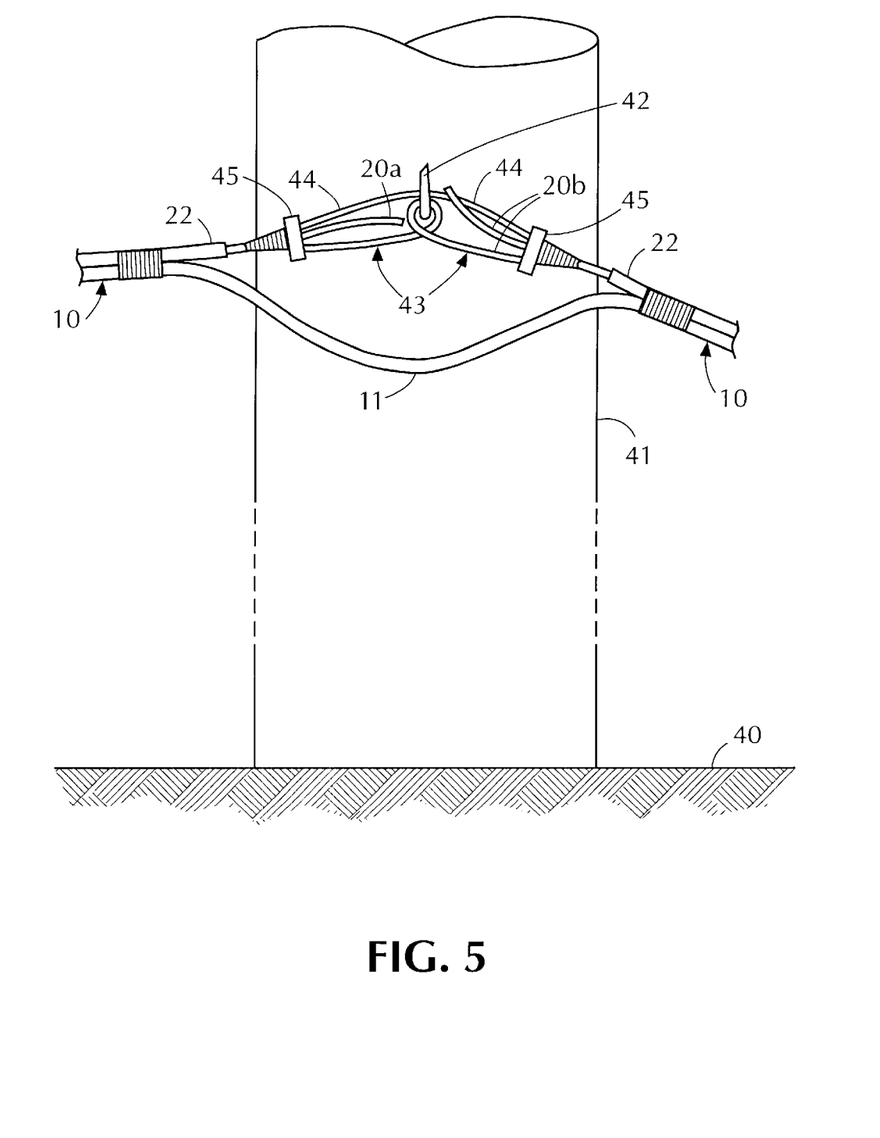
FIG. 5 illustrates schematically the outdoor mounting of the optical fiber drop cable of FIG. 3 on a support.

FIG. 5 is a schematic, fragmentary illustration of an aerial suspension of the cable 10. Referring to FIG. 5, the cable 10 is mounted above ground 40 on a support 41, such as a utility pole. A longitudinal portion of the outer jacket 22 of the subunit 21 has been removed, for example, by cutting at the web 24 to separate the units 11 and 21 and using suitable stripping tools to strip away the jacket 22, to expose a longitudinal portion or length of the strength member 20 which is cut to provide free ends 20a and 20b. A suitable hook 42 is attached to the pole 41 and the free ends 20a and 20b are secured to the hook 42 by known devices 43 comprising loops 44 and wire vises 45, the latter of which clamp onto the free ends 20a and 20b.

The pole 41 can be adjacent the customer's premises, and the cable 10 would extend from such pole to the customer's structure, e.g., a building, where the cable would be similarly secured to the building. Also, the cable 10 can be similarly suspended between pairs of poles which can, for example, be spaced apart by 200 feet or more and encounter loads due to wind and icing. See, for example, the requirements set forth in the NESC Rules.

In a preferred embodiment, the jacket portion 22 is not bonded to the strength member 20 to provide that a longitudinal portion of the portion 22 can be removed with relative ease to expose a longitudinal portion or length of the strength member 20.

In a further preferred embodiment, the strength member 20 is made from a high strength material, such as a dielectric, fiber reinforced polymer or metallic material, to provide the cable 10 with a predetermined degree of robustness and a predetermined tensile stiffness, and the jacket portion 22 is not bonded to and, therefore, can easily be separated from the strength member 20. Thus, the strength member 20 provides tensile strength and antibuckling properties to the cable 10.

In a preferred embodiment, the strength member 20 is of sufficient strength to minimize bending of the cable 10 into a small radius, which could adversely affect cable performance. Preferably, the strength member 20 has a Young's modulus of about 40–150 Gpa, and most preferably about 40,000 Mpa when the strength member 20 is e-glass, about 120,000 Mpa when the strength member 20 is aramid material and about 200,000 Mpa when the strength member 20 is stainless steel.

In a preferred embodiment, the strength member 20 is of sufficient strength to support the entire weight of the cable 10 in an aerial application plus an additional loading which weather may cause in the aerial application and, therefore, avoid significant bending or tensile stress and strain on the fiber 15, thereby maintaining optical signal attenuation in the fiber 15 below the predetermined maximum.

In a further preferred embodiment, the strength member 20 can be formed from one or more of the following materials: i) solid galvanized steel wire or solid stainless steel wire having an outside diameter between about 0.060–1.00 inches, and most preferably, about 0.078–0.082 inches; ii) stranded galvanized steel wire or stranded stainless steel wire having an outside diameter between about 0.060–0.100, and most preferably 0.078–0.082 inches; iii) glass reinforced polymer rod having an outside diameter between about 0.060–0.110 inches; and iv) reinforced aramid yarns with a total denier of about 17,000–51, 120 and having an outside diameter of about 1.9 mm. It is to be understood that the strength member 20 can include other types of steel.

The materials which are selected for manufacture of the strength member 20 would depend, in part, on the actual planned application of the drop cable 10 and economic considerations. The cost of the above-recited materials for the strength member, from lowest to highest, is galvanized steel, stainless steel, e-glass and aramid yarns.

The durability of the strength materials, from greatest to least, is stainless steel, galvanized steel which if nicked can rust easily and therefore compromise a relatively thin galvanized steel wire, e-glass or aramid. Corrosion resistance provided by galvanized or stainless steel is particularly desirable for an aerial application of the cable 10 where portions of the strength member 20 may be exposed to the environment. It is to be understood that other types of corrosion resistant coating layers can be disposed on the strength member 20 or that the strength member 20 itself can be made of materials which are inherently corrosion resistant.

As to the considerations of convenience for purposes of installation and utilization of standard mounting hardware, stainless steel wire is most preferable for the strength member 20 because it is most difficult to damage and can be used with a variety of commonly available hardware. In place of stainless steel, the order of preference for the material of the strength member 20 would be galvanized steel followed by e-glass and then aramid.

Aramid is most susceptible to damage from moisture and sunlight. Aramid's flexibility and lack of memory as to shape, however, makes it easiest to handle by technicians in the field. Stranded steel has relatively little memory as to shape. Solid steel has some memory and e-glass has even more shape memory as it is extremely resilient or spring like.

The use of a solid wire as a strength member, such as a steel wire which is prone to form kinks or bends in the cable which, when formed, do not straighten out, may be undesirable if the optical fiber in the cable is likely to experience much acute bending in application, which would likely result in an increase in optical signal attenuation.

Although e-glass is not likely to experience permanent bends or kinks which can affect the overall cable 10, and thus the fiber 15, e-glass cannot be bent very tightly because it is sensitive to handling and likely to shatter. Also, e-glass has the least strength such that more e-glass must be included in a cable to provide the same strength that a comparably or smaller sized diameter stainless steel rod would provide. In a further embodiment, the strength member 20 can be coated with a water swellable agent for water blocking purposes.

In an alternative embodiment, one or more completely dielectric, rigid anti-compression members, such as fiber glass rods or Kevlar rods impregnated with polymer resin, can constitute the strength member 20.

In a preferred embodiment, the outside diameter of the member 20 is about 2.7–4.0 mm. In a further preferred embodiment, each of the subunits 11 and 21 have an outside diameter of about 2.9 mm, which is the dimension of standard indoor optical fiber cable application tooling.

In the preferred embodiment, the outer surface of the subunit 21 is cylindrical in shape.

In the preferred embodiment illustrated in FIGS. 1–2, the subunits 1 and 21 are coupled to each other in a FIG. 8 configuration, and the subunit 21 extends longitudinally along an axis which is parallel to the axis along which the subunit 11 extends.

Referring to the cross-section of the cable 10 illustrated in FIG. 2, the respective axes of the subunits 11 and 21 are spaced from each other so that the nominal external peripheries 19 and 23 of the subunits 11 and 21, respectively, are substantially tangentially in contact with each other extending along the longitudinal lengths of the subunits 11 and 21. The web 24 is made of the same or similar material as the jacket portions 18 or 22, and extends between the facing surfaces of the peripheries 19 and 23 of the subunits 11 and 21. The web 24 is bonded to or integral with the jacket portions 18 and 22 to couple the subunits 11 and 21 to each other, thereby forming the composite structure of the cable 10. The strength of coupling between the subunits 11 and 21 and the web 24 is sufficient to maintain the subunits 11 and 21 physically connected to each other under manipulation normally expected to occur during storage of the cable and during handling and application of the cable 10 in an outdoor application where, for example, portions of the subunit 21 or the strength member 20 alone are secured to spaced poles, while simultaneously providing that the subunit 11 can be separated intentionally from the subunit 21 with relative ease by a field technician using standard splicing tools without causing damage to the integrity of the individual components within the cable 10, i.e., the optical fiber 15 contained within the subunit 11.

Hence, the sole strength element for supporting the cable 10 in an aerial application can be contained within the subunit 21, which is readily separable from the subunit 11 which contains the communication means, e.g., the fiber 15. Therefore, the portion of the cable 10 making the cable self-supporting can be separated from the communication portion, i.e., the fiber 15, of the cable and the fiber 15 would still remain protected from mechanical stresses within the subunit 11, e.g., by the outer sheath 18, the strength members 17 and the buffering layer 16.

Referring to FIG. 1, for ease of reference, the cable 10 is described below with reference to mutually orthogonal axes corresponding to a thickness dimension T, a length dimension L, and a width dimension, W, of the cable 10. In a preferred embodiment, the web 24 extends a distance C along the circumference of each of the facing surfaces of the respective peripheries 19 and 23 of the subunits 11 and 21 to provide that the web 24 has a thickness $T_{web}$, which is preferably between about 0.15–0.65 mm. It is to be understood that the web 24 can extend a different circumferential distance along the periphery of each of the subunit 11 and the subunit 21.

In a further preferred embodiment, the thickness of the material around the bore 18a can be less than the thickness of the material around the strength member 20.

In a preferred embodiment, one step of the manufacture of the subunits 11 and 21 of the cable 10 includes extrusion of plastic material, preferably the plastic material of the jacket portions 18 and 22, to form the portions 18 and 22 and the web 24 as a single or integral layer of material.

In a further preferred embodiment, the jacket portions 18 and 22 and the web 24 may be extruded to provide that the cable 10 is non-axisymmetric.

In a preferred embodiment, the strength member 20 is of sufficient tensile and loading strength to support the entire weight of the cable 10 when the cable 10 is installed in an aerial application involving securing the strength member 20 or the subunit 21 to poles spaced from one another at approximately 200–250 foot intervals. In a further preferred embodiment, the strength member 20 is of sufficient tensile and loading strength to support the entire weight of the cable 10 in such aerial application under such loading as set forth in the NESC standards, incorporated by reference herein, concerning exposure to transverse wind loads and accumulation of a layer of ice radially on the outer surface of the cable, without the fiber 15 experiencing significant optical signal attenuation, for example, preferably less than about 0.7 dB/km. For example, the strength member 20 in the cable 10 can have an outside diameter of about 1.9 mm and be made of a material which provides the cable with sufficient tensile strength to withstand the loading on the aerially installed cable which the accumulation of about one-half of one inch of a layer of ice radially on the external surfaces of the cable 10 may cause without significant increase of the optical signal attenuation, i.e., preferably less than about 0.7 dB/km.

In a preferred embodiment, the fiber 15 of the cable 10 in the above-described aerial application would not experience significant optical signal attenuation, preferably less than about 0.7 dB/km, if up to about one-half of one inch of a layer of ice accumulates radially on the external surfaces of the cable 10 and the cable 10 is subjected to up to about 30 mph winds transverse to its axial length. Thus, advantages are obtained by limiting the overall outer diameter of the cable 10, which minimizes the loading that a layer of ice formed on external surfaces of the cable 10 may cause. Therefore, for expected winter weather outdoor applications of the cable 10, stainless steel is the preferred material for the strength member 20.

Advantageously, the cable 10 similarly can operate as an indoor or premises cable upon separation of the support subunit 21 from the fiber unit 11. The web 24 provides that the separation can be performed with relative ease and while maintaining the fiber 15 protected within the fiber subunit 11. Thus, the subunit 11 is a complete, self-contained and independent cable which can be handled, stored or installed and can maintain its integrity under a wide range of adverse conditions without the subunit 21. In a preferred embodiment, the above-described components of the subunit 11 are constructed with relative lightweight and flexible materials to ease handling of the subunit 11 and its internal components during installation in ducts, trays or passageways or in indoor riser applications. In a further preferred embodiment, the subunit 11 can have a simple and lightweight construction that facilitates access to and handling of the fiber 15 when the subunit 21 is separated from the subunit 11 of the cable 10.

In one preferred embodiment, the outer diameter of the cable 10 is of a value which provides that the subunit 11 can be routed into enclosures indoors with or without the subunit 21 attached to the subunit 11. In a preferred embodiment, the subunit 11 has an outer diameter which provides that it can easily pass through small seals or rubber grommets.

Preferably, the subunit 11 is flexible and rugged, and can be organized within an enclosure using the same support hardware which is commonly utilized in connection with installing copper drop cables, such as the Wire Vise clamp manufactured by MacClean Power Systems, 1141 Addison St. Franklin Park, Ill. 60131, the STRANDVISE clamp or the spiral dead-end clamp.

In a further embodiment, the fiber subunit 11 has an outer diameter which provides for ease of access and application with a pair of standard wire strippers or cutters.

In a preferred embodiment, the single strength member 20 is of a predetermined diameter and tensile strength such that when the subunit 21 is separated from the subunit 11, the member 20, with or without the plastic portion 22, can be easily anchored to a pole in an aerial application of the cable or secured within special enclosures, such as those manufactured by Tyco/Raychem of Fuquay-Varina, N.C.

Figure 3:
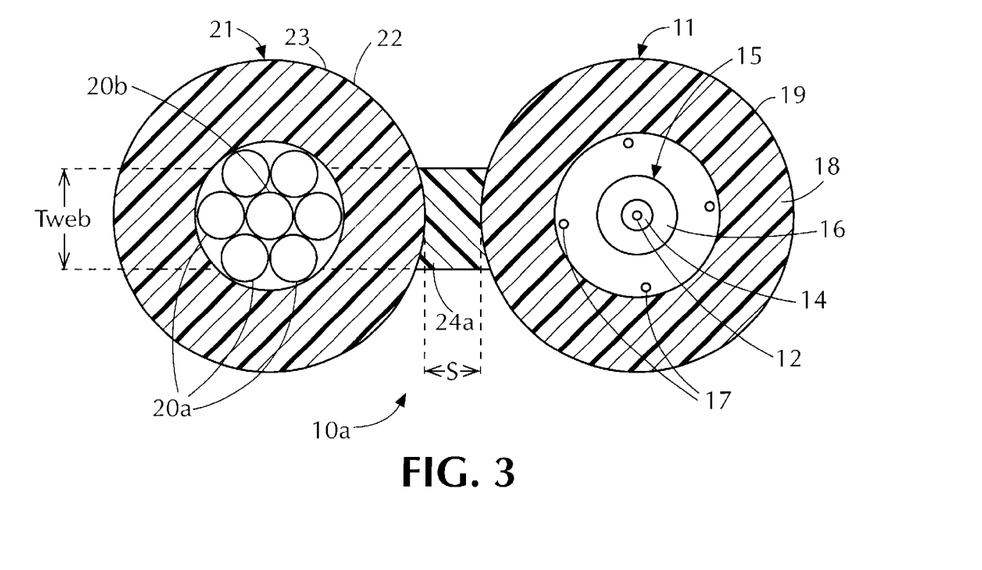
FIG. 3 is a cross-sectional view of an alternative embodiment of an optical fiber drop cable in accordance with the present invention.

FIG. 3 illustrates an alternative embodiment of a cable 10A according to the present invention. Components in the cable 10A identical to those described above with respect to the cable 10 are referred to below using like reference numerals. Referring to FIG. 3, the cable 10A includes subunits 1 and 21 and internal components 12, 14, 15, 16, 17, 18 and 22 which are constructed and preferably function identically as described above for the cable 10. The subunits 11 and 21 extend along respective parallel axes and are spaced from each other a distance S between the closest points on the facing surfaces of the peripheries 19 and 23. A web 24A extends between the closest points of the subunits 11 and 21 and between portions of facing surfaces defined by respective peripheries 19 and 23 of the subunits 11 and 21 extending away from the respective closest points. The web 24A joins the subunits 11 and 21 to each other and has a thickness $T'_{web}$. The dimensions S and $T'_{web}$ of the web 24A are predetermined to provide that cable 10A has the same structural and functional features with respect to the interconnection and coupling between the subunits 11 and 21 as described above for the cable 10. Like the cable 10, the cable 10A can be manufactured so that the jacket portions 18 and 22 and the web 24A constitute a single composite layer of plastic formed by extrusion of plastic material.

Referring again to FIG. 3, the jacket portion or strength member 22 of the subunit 21 encloses six stainless steel wires 20A stranded longitudinally about a single, central stainless steel wire 20B. In a preferred embodiment, the stranded combination of the steel wires 20A and 20B have a total diameter of about 5/64 inches to provide an optimal packing density to ease manufacture of the subunit 21.

Figure 4:
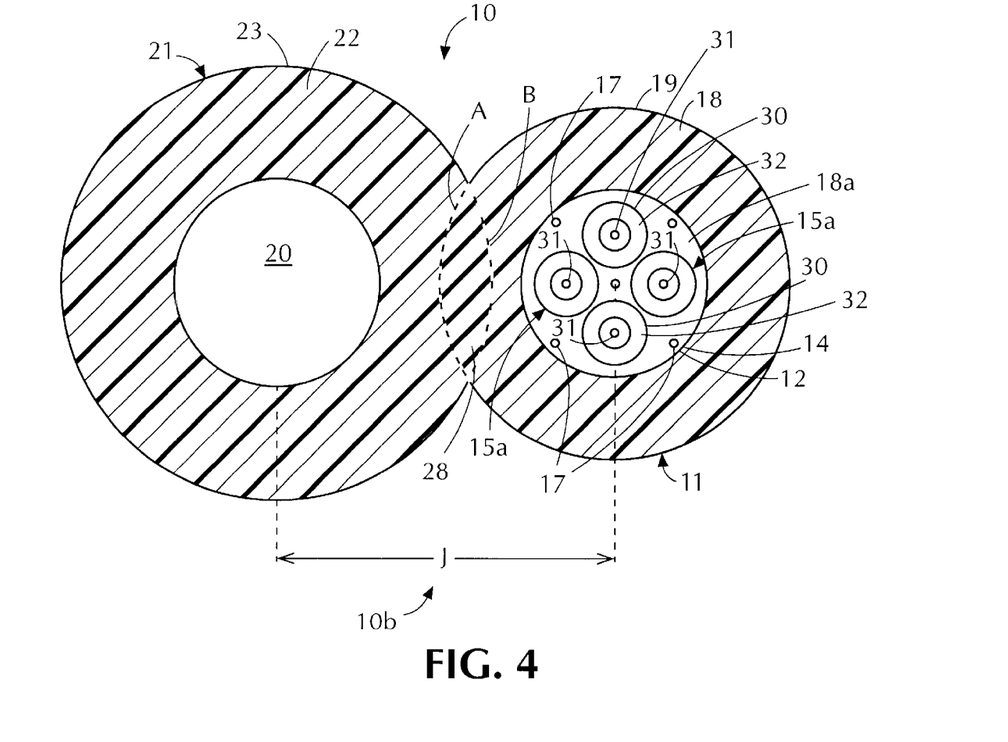
FIG. 4 is a cross-sectional view of another embodiment of optical fiber drop cable in accordance with the present invention.

FIG. 4 illustrates another preferred embodiment of a cable 10B according to the present invention. Components in the cable 10B identical to those described above with respect to the cable 10 are referred to below using like reference numerals. Referring to FIG. 4, the cable 10B includes a subunit 11 loosely containing two tight buffered optical waveguide fibers 15A, each of which is formed from the elements 12, 14 and 16 as described above for the cable 10. The jacket portion or subunit sheath 18 loosely encloses the two tight buffered fibers 15 along their longitudinal lengths. In addition, two longitudinally extending electrical conductors 30, each of which includes a longitudinally extending conductor 31, such as 22 gauge copper wire, surrounded by a layer of insulation 32, such as polyethylene, are loosely received within the sheath 18. Each of the insulated electrical conductors 30 has an outer diameter of about 1.2 mm.

The subunit 21 includes the strength member 20 enclosed by the jacket portion or subunit sheath 22. The outer diameter of the subunit 21 exceeds the outer diameter of the subunit 11 as, for example, would likely occur if an e-glass rod was used as the member 20.

The cable 10B is manufactured to have the axes of the respective subunits 11 and 21 spaced a predetermine distance J from each other such that the cable 10B includes an intermediate connection portion 28 which constitutes a structure shared by the subunit sheath 18 and the subunit sheath 22. As illustrated in FIG. 4, the intermediate portion 28 is within each of the nominal peripheries 19 and 23, which are indicated by dashed lines for clarity. Thus, the subunits 11 and 21 overlap or share the intermediate portion 28 which joins the subunits 11 and 21 to each other. The shared intermediate portion 28 extends distances A and B along the nominal outer peripheries 19 and 23 of the subunits 11 and 21, respectively, to provide that the cable 10B has the same functional and structural features as to the interconnection and coupling between the subunits 11 and 21 described above for the cable 10 and 10A. It is to be understood that the intermediate portion 28 in the cable 10B can constitute any shaped structure in which jacket material defined within the nominal periphery of either subunit is shared with the jacket material defined within the nominal periphery of the other subunit to provide the same or similar support functionality and installation ease described above with respect to the cable 10.

Although preferred embodiments of the present invention have been described and illustrated, it will be apparent to those skilled in the art that various modifications may be made without departing from the principles of the invention.

What we claim is:

1. An optical fiber cable for suspension between outdoor supports spaced at least a predetermined distance apart, said cable comprising:

a flame retardant, ultra-violet stabilized plastic jacket, the jacket having a length, a width transverse to said length and a thickness transverse to said width, said jacket having a first lengthwise portion and a second lengthwise portion spaced from the first lengthwise portion in the width direction of the jacket and interconnected with the first lengthwise portion by an intermediate plastic material portion of a thickness less than the thickness of the first and second lengthwise portions to assist in intentional separation of the first and second lengthwise portions of the jacket into sub-units;

a strength member within said first portion and extending lengthwise of the jacket;

said strength member having a strength sufficient to support said cable and said intermediate portion of the jacket having sufficient strength to prevent separation of said first and second portions when the cable is suspended between said supports and said strength member being without a bond to the jacket which would prevent the strength member from being readily exposed for connection to a support;

at least one tight buffered optical fiber loosely received within said second portion of the jacket and extending lengthwise of the jacket, said second portion of the jacket being without a rigid strength member to permit ease of bending of said second portion when the second portion is separated from said first portion and used indoors.

2. An optical fiber cable as set forth in claim 1 wherein said distance is at least one hundred feet.

3. An optical fiber cable as set forth in claim 2 wherein said distance is less than about five hundred feet.

4. An optical fiber cable as set forth in claim 1 wherein said second portion of the jacket has a lengthwise bore in which the at least one optical fiber is received and which has a cross-section larger than the cross-section of the optical fiber or fibers received in the bore.

5. An optical fiber cable as set forth in claim 4 wherein the cable further comprises at least one lengthwise extending flexible strength member within said bore.

6. An optical fiber cable as set forth in claim 5 wherein the strength member in the bore is a yarn.

7. An optical fiber cable as set forth in claim 5 wherein there is a plurality of strength members within the bore disposed adjacent to each other and around the optical fiber or fibers within the bore.

8. An optical fiber cable as set forth in claim 7 wherein at least some of the strength members within the bore are spaced from adjacent strength members within the bore.

9. An optical fiber cable as set forth in claim 1 wherein the strength member is a metal strength member.

10. An optical fiber cable as set forth in claim 9 wherein the metal strength member is a stranded steel wire.

11. An optical fiber cable as set forth in claim 1 wherein the strength member is a non-metallic strength member.

12. An optical fiber cable as set forth in claim 11 wherein the strength member is a polymer rod.

13. An optical fiber cable as set forth in claim 11 wherein the strength member is formed by aramid yarns.

14. An optical fiber cable as set forth in claim 1 wherein the thickness of the intermediate portion of the jacket is in the range from about four percent to about ninety percent of the thickness of one of the first and second lengthwise portions.

15. An optical fiber cable as set forth in claim 14 wherein the thickness of the intermediate portion of the jacket is at least fifty percent of the thickness of one of the first and second lengthwise portions.

* * * * *